United States Patent [19]

Boskovitch

[11] 3,770,110
[45] Nov. 6, 1973

[54] BURN-CUTTING APPARATUS

[75] Inventor: Peter P. Boskovitch, Hammond, Ind.

[73] Assignee: Goodman Equipment Corporation, Chicago, Ill.

[22] Filed: Jan. 21, 1969

[21] Appl. No.: 792,372

[52] U.S. Cl.............. 198/220 DA, 83/104, 266/23
[51] Int. Cl............................................. B65g 27/00
[58] Field of Search ................... 214/1 F, 1 C, 1.2; 198/220 A; 83/104, 107; 266/23 A, 23 F, 23 J, 23 K, 23 T

[56] References Cited
UNITED STATES PATENTS

| | | | |
|---|---|---|---|
| 2,029,133 | 1/1936 | Sloane | 74/26 |
| 2,216,603 | 10/1940 | Schwimmer | 83/104 X |
| 2,590,133 | 3/1952 | Shaffer et al. | 198/220 A X |
| 3,486,744 | 12/1969 | Beyers et al. | 266/23 A |
| 2,292,665 | 8/1942 | Schneible | 214/16 R X |

Primary Examiner—Drayton E. Hoffman
Assistant Examiner—Frank E. Werner
Attorney—Fitch, Even, Tabin & Luedeka

[57] ABSTRACT

Apparatus for supporting metal plates and sheets during torch-cutting operations and for receiving, storing and carrying away the waste scrap and slag materials. A stationary, elongated work table provides support during cutting and is open for scrap and slag to fall through. An elongated trough beneath the work table receives and stores waste materials. Periodically, the operator actuates a drive mechanism which converts the storage trough to a shaker conveyor for carrying the material away to a discharge point.

1 Claim, 3 Drawing Figures

PATENTED NOV 6 1973

3,770,110

INVENTOR.
Peter P. Boskovitch
BY
Murray A. Gleeson
ATTORNEY

BURN-CUTTING APPARATUS

BACKGROUND OF THE INVENTION

The field of invention is a burn-cutting apparatus in which a gas cutting torch cuts out predetermined shapes from metal plates and sheets which are supported on a horizontal work table.

Often these are repetitive operations, cutting the same shape over and over again, in automatic or semiautomatic machines, and following a pattern or template. The high production rates of some of these machines create storage and disposal problems because of the large quantities of scrap and slag which collect on and around the work table. Time spent by the operator in shoveling and cleaning up this waste necessarily detracts from his productive work.

SUMMARY OF THE INVENTION

This invention relates generally to burn-cutting apparatus, and more particularly to an improved arrangement for receiving, storing, and disposing of waste scrap and slag materials.

An important object is to provide means for supporting the plate or sheet above an open frame burning table and to drop the scrap and slag through the opening directly into a trough which can be actuated as a reciprocable conveyor to carry the material away.

A specific object is to provide a burn-cutting apparatus having an open work table through which the scrap and slag drops into a storage trough, and provide a shaker conveyor drive selectively converting the storage trough to a conveyor trough as needed for carrying the material away to a discharge point.

Other objects and advantages will be apparent from the following description taken in connection with the drawings in which.

Figure 1:
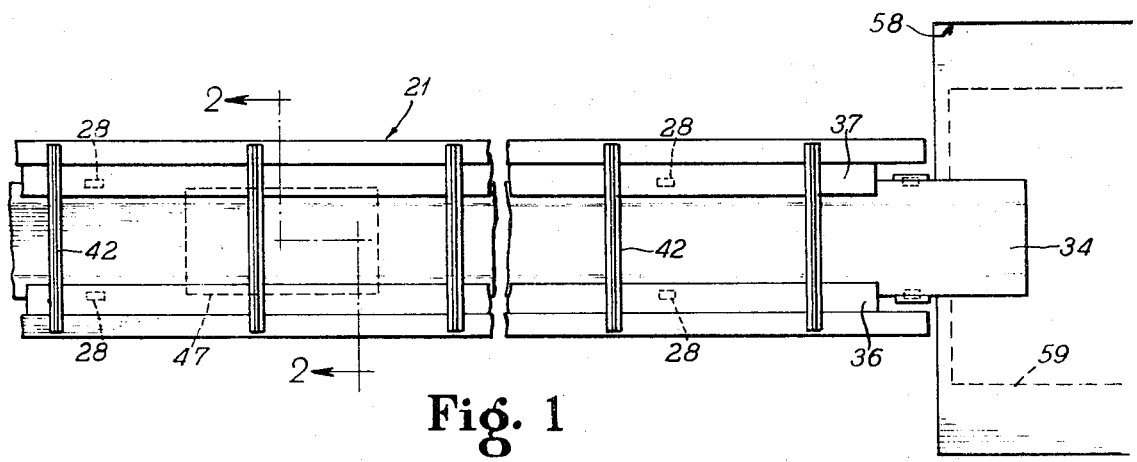
FIG. 1 is a fragmentary plan view of a burn cutting apparatus which is a preferred form of the present invention.

Referring now more particularly to the drawings, the novel burn-cutting apparatus is generally designated 21. A base 22, in this case comprising a concrete floor with a pit 23, has mounted thereon a pair of stationary, spaced, parallel, horizontal main support members 24,26. As shown these are steel I-beams.

At intervals along the floor are roller frames 27, each with a cyclindrical roller 28 supporting an angle track 29 each connected as by a gusset 31 to a corresponding angled sidewall 32 or 33 of a combined receiving, storing and conveying trough 34.

Downwardly converging, angled guide plates 36,37, supported by back up members 38 and struts 39, have lower marginal portions 41 overlapping the trough sidewalls 32 and 33 respectively.

Figure 2:
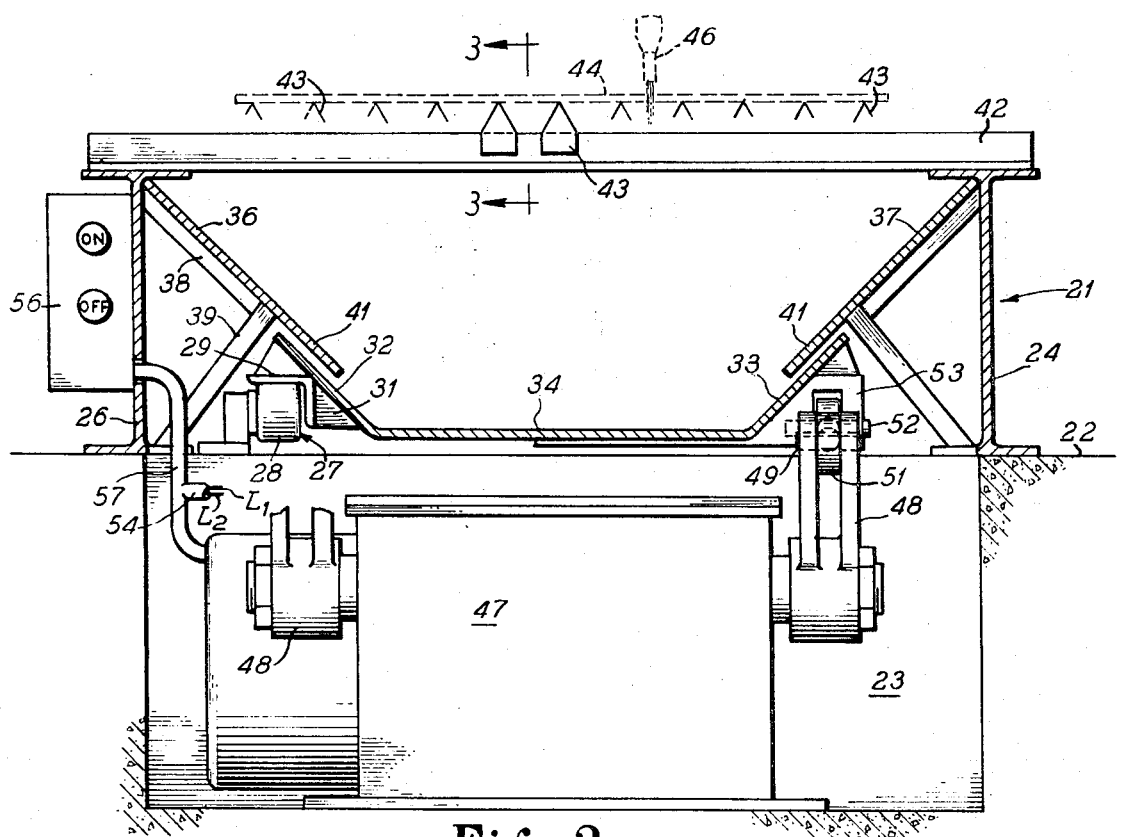
FIG. 2 is a cross section of FIG. 1 taken along the line 2—2.
Figure 3:
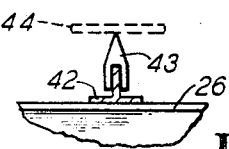
FIG. 3 is a fragmentary cross sectional view of FIG. 2 taken along the line 3—3.

As will be observed in FIG. 2, there is a great space between the guide plates 36 and 37 through which, as will be described, scrap and slag may drop into the trough 34.

Atop the two main support members 24, 26 are several transverse, adjustable beams 42. Each of these is movable forward and backward along the main supports 24,26 to furnish proper support for the work.

Each of the beams 42 is provided with one or more upstanding tangs 43 and they are movable for adjustment along the beams.

Thus, by adjusting the tangs 43 along the beams 42 and, in turn, adjusting the beams 42 forward and backward along the support members 24, 26, a suitable combination can be provided to support a plate or sheet 44 without damage either to the tangs or beams by the cutting torch 46. Longitudinal beams 24 and 26 cooperate with transverse beams 42 to form an elongated work table.

It will be understood that the torch 46 may take any form suitable for the purpose. It may be hand held and following a line drawn on the plate or, as is more common in production practice, it will be guided by a machine automatically following a pattern or template (not shown).

In the pit 23 a shaker conveyor drive 47 has a pair of rocker arms 48. Each is pivotally connected through a pin 49 to a puller rod 51 which, in turn, is pivotally mounted on a pin 52 on a drive trough 53 which is connected to the trough 34. The shaker conveyor drive unit 47 is described in detail in Patent No. 2,029,133 to which reference may be made for a more complete description.

The shaker drive 47 is energized through lines $L_1$ and $L_2$ in conduit 54. An "on," "off" switch 56 is connected with lines $L_1$ and $L_2$ and the drive through a conduit 57 to control the starting and stopping of the drive unit and the operation of the trough 34 as a shaker conveyor.

In use, the beams 42 and tangs 43 will be positioned so the cutting torch 46 will follow the desired path without cutting the tangs; and the areas under the scrap to be cut out will be left unsupported so they will drop down through the space between guides 36, 37, onto the trough 34. There may be one or two or more of these work areas along the length of the trough 34. As the pile of scrap and slag builds up, the operator can move it away simply by pressing the "on" button of switch 56. He may, if desired, merely move the waste material slightly downstream to get it out of the way or he may move it all the way down to the discharge pit 58 which may contain a bucket 59. The latter may be lifted out by a crane for disposal when it is filled.

Thus it will be apparent that the present invention has a wide degree of utility in receiving and storing the waste scrap and slag from a burn-cutting operation and in converting the trough into a reciprocable shaker conveyor, at the press of a button, when necessary to move the waste to a disposal point.

I claim:

1. In a burn-cutting apparatus, the combination comprising a stationary elongated work table including two longitudinally extending, laterally-spaced beams defining the table side margins, and a series of transverse beams spanning the longitudinally extending beams for supporting metal plates at selected stations along the table length, the spaces between the transverse beams defining openings between which cut-off scrap and waste material slag can fall, an upwardly open shaker conveyor trough extending directly below the work table for reciprocation longitudinally of the table to convey the fallen material from the area beneath the table, said trough being coextensive in length with the table for handling all of the fallen material, drive means for imparting a reciprocal conveying motion to the shaker trough to move the material in a longitudinal direction, and control means for selectively energizing said drive means, said table having dependent guides extending along both side margins of the table for directing the fallen material into the trough, said conveyor trough being appreciably narrower than the table and said marginal guides taking the form of downwardly convergent plates overlapping the marginal edges of the trough to guide the fallen material into the trough.

* * * * *